April 6, 1937. G. H. HUFFERD 2,076,028
SELF ADJUSTING BALL JOINT
Filed April 11, 1935
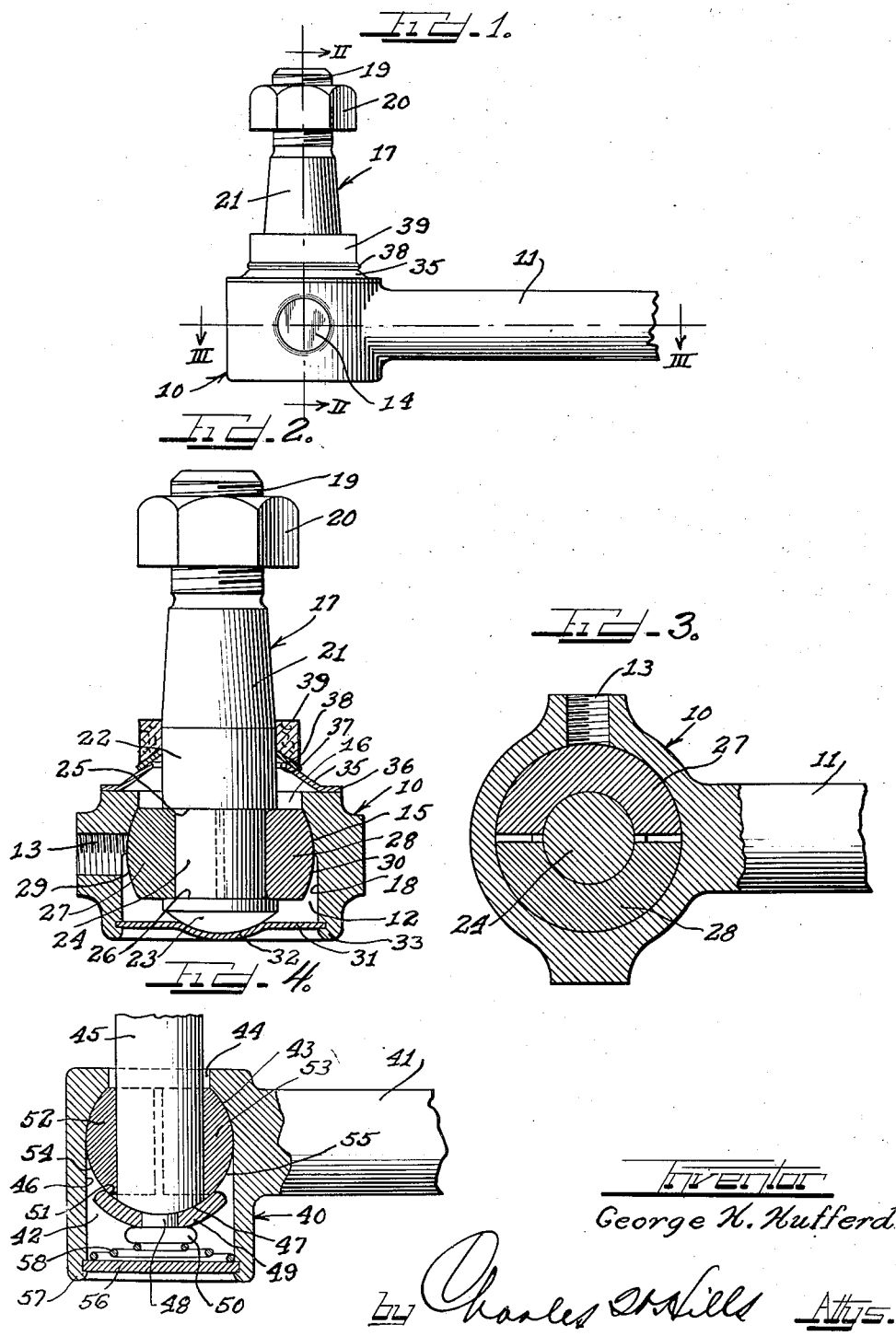
Inventor
George H. Hufferd
by Charles H. Wills Attys.

Patented Apr. 6, 1937

2,076,028

UNITED STATES PATENT OFFICE 2,076,028

SELF-ADJUSTING BALL JOINT

George H. Hufferd, Detroit, Mich., assignor to Thompson Products, Incorporated, Cleveland, Ohio, a corporation of Ohio Application April 11, 1935, Serial No. 15,798

9 Claims. (Cl. 287—90)

This invention relates to a joint suitable for use in automotive tie rod and drag link connections.

More specifically this invention relates to joints having stud members rotatable within seating elements and tiltable on said elements in a housing with means to urge the respective parts of the joint into closer contact to compensate for wear and to prevent rattling.

It is an object of this invention to provide a joint having a universally movable stud member rotatable about its own axis within a pair of complementary seating elements which elements are in turn tiltable in a housing.

A further object of this invention is to provide a self-adjusting ball joint that is adapted to replace customary ball headed stud joints.

A further object of this invention is to provide a self-adjusting ball joint which does not require careful machining of cooperating bearing parts.

A still further object of this invention is to provide a tie rod joint in which the stud member is rotatable about its own axis on one pair of bearing surfaces and tiltable on another pair of bearing surfaces with the respective bearing elements being urged into closer cooperation at all times during use of the joint.

A further object of this invention is to provide a substitute for ball joints in which the stud member is fitted in complementary seating elements having segmental spherical outside bearing surfaces so that careful machining of the stud head is not required.

Other and further objects of this invention will be apparent from the following detailed description of the annexed sheet of drawings which discloses preferred embodiments of this invention.

On the drawing:

Figure 1 is an elevational view of a joint according to this invention showing a fragmentary portion of the link arm of the housing.

Figure 2 is an enlarged cross-sectional view, with parts in elevation, taken substantially along the line II—II of Figure 1.

Figure 3 is an enlarged cross-sectional view, with the link arm in elevation, taken substantially along the line III—III of Figure 1.

Figure 4 is a cross-sectional view, with the fragmentary link arm in elevation, of a modified form of self-adjusting joint according to this invention.

As shown on the drawing:

In Figures 1, 2 and 3, the reference numeral 10 indicates generally a socket having an integral arm or link 11 extending laterally therefrom and a bore 12 extending therethrough at right angles to the arm 11. A portion of the socket 10 is tapped and threaded to provide an opening 13 thereto for a grease plug 14 to permit lubrication of the elements within the socket.

The bore 12 of the socket 10 is defined by a series of wall portions including an intermediate segmental spherical wall portion 15, the small end of which defines a restricted opening 16 through which a stud 17 may freely extend. A cylindrical wall portion 18 of slightly larger diameter than the larger end of the segmental spherical wall portion 15 forms a continuation of the bore 12 from the larger end of the segmental spherical wall portion 15.

The stud 17 comprises a threaded end 19 adapted to receive a nut 20, an intermediate tapered portion 21 adapted to receive the boss end of a link connection therearound, a cylindrical portion 22 below the tapered portion 21 and a rounded end 23. Between the cylindrical portion 22 and the rounded end 23 there is formed a cylindrical bearing portion 24 of smaller diameter than the head and cylindrical portion 22 so that the bearing portion 24 is defined by shoulders 25 and 26 respectively (Figure 2).

A pair of semi-annular collars or seating elements 27 and 28 are disposed around the cylindrical bearing portion 24 in spaced complementary relation. These collars or seating members 27 and 28 are abutted by the shoulders 25 and 26 and are provided with segmental spherical outside bearing surfaces 29 and 30 respectively adapted to cooperate with the segmental spherical wall portion 15 of the socket 10.

A closure plate 31 having a depressed center portion 32 adapted to receive the rounded end 23 of the stud is spun into the end of the socket 10 by peening the socket wall over the periphery of the plate 31 as shown at 33. The closure plate 31 is preferably formed of a springy metal and is adapted to act against the rounded end 23 of the stud for forcing the seating elements 24 and 25 in closer cooperative bearing relation with the socket wall portion 15. At the same time, the curved nature of the wall portion 15 urges the seating elements into proper bearing relation with the cylindrical bearing portion 24 of the stud. In this manner all of the cooperating bearing surfaces are maintained in constant bearing relation, and any wearing away of the surfaces is immediately taken up by the spring closure plate urging the members into closer bearing relation.

The opening 16 of the joint may be closed by any suitable dust cap. A form of dust cap which does not interfere with the movement of the stud 17 is preferred. For this purpose an annular conical member 35 having a flat flanged end 36 adapted to rest on top of the socket 10 and an opening 37 of larger diameter than the diameter of the stud is placed around the stud to rest on top of the housing as shown in Figure 2. A second conical member 38 adapted to snugly engage the cylindrical portion 22 of the stud is disposed around the stud over the member 35. The member 38 is adapted to slide over the member 35 when the stud is tilted or rotated. A felt washer 39 may be disposed over the member 38 so that when the end of a link arm is mounted on the tapered portion 21 of the stud 17 the washer 39 will be compressed to hold the cap members 35 and 38 in position on the socket.

In Figure 4 the reference numeral 40 indicates generally a socket member having a laterally extending link arm 41 integral therewith and a bore 42 extending therethrough at right angles to the arm 41.

The bore 42 is defined by a segmental spherical wall portion 43 at one end thereof which in turn defines a circular opening 44 through which a stud 45 may freely extend. A cylindrical wall portion 46 having a diameter equal to the largest diameter of the segmental spherical portion 43 forms a continuation of the bore from the larger end of the segmental spherical portion 43.

The end of the stud 45 which is disposed in the socket 40 is rounded as shown at 47. This rounded end 47 has a cylindrical boss 48 extending from the center thereof. A curved washer 49 is disposed around the boss 48 and held against the rounded end 47 of the stud by peening over the end of the boss 48 to form an enlarged head 50 thereon. The ends of the washer 49 extend beyond the periphery of the stud 45 to form a shoulder 51 therearound. A pair of semi-annular collars or seating elements 52 and 53 are disposed in spaced complementary relation around the cylindrical stud 45 and are abutted by the shoulder 51 formed by the washer 49. The seating elements 52 and 53 are formed with spherical outside surfaces 54 and 55 adapted to cooperate with the segmental spherical bearing surface 43 of the socket 40.

The end of the socket 40 may be closed by a closure plate 56 spun therein by peening the ends of the socket over the periphery of the plate 56 as shown at 57. A coiled conical spring 58 is held under compression between the closure plate 56 and the head 50 of the boss 48 to urge the bearing surfaces 54 and 55 of the seating element against the spherical wall portion 43. At the same time the semi-annular elements 54 and 55 are urged into proper bearing relation around the cylindrical stud. In this manner the stud 45 is free to rotate about its own axis within the seating elements 53 and 54 and may be readily tilted through a limited arc relative to the socket 40 on the outside spherical surfaces of the seating elements. The open end 44 of the socket may be closed by a dust cap similar to the arrangement shown in Figure 2.

It is obvious from the above description that this invention provides for a joint structure in which a stud is rotatable within a pair of spaced semi-annular seating elements which elements are in turn tiltable in a housing. As the bearing surfaces of the various parts of the joint wear away the wear is immediately taken up by spring elements which constantly urge the parts into closer contact.

Having now described my invention, I am aware that many changes may be made and numerous details of construction may be varied through a wide range without departing from the principles of this invention, and I, therefore, do not purpose limiting the patent granted hereon otherwise than necessitated by the prior art.

I claim:

1. A joint comprising a stud having a cylindrical bearing portion, a pair of complementary semi-annular collars disposed around said bearing portion in spaced relation to each other permitting rotation of the stud therein, a housing having an inner bearing surface cooperating with the collars to permit a universal tilting of the stud relative to the housing and means urging the stud into constant bearing engagement with the collars.

2. A joint comprising a socket member having a segmental spherical inner wall portion, a stud extending freely from said socket and having a cylindrical bearing portion in the socket, a pair of complementary semi-annular seating elements disposed between the wall portion of the housing and the bearing portion of the stud, said elements having cylindrical inner bearing surfaces cooperating with the bearing surface of the stud to permit rotation of the stud about its own axis and also having outer segmental spherical bearing surfaces cooperating with the socket wall portion to permit universal tilting of the stud and means for urging said bearing surfaces into closer contact.

3. A joint comprising a housing having a segmental spherical bearing surface therein, a stud extending from said housing in free tiltable and rotatable relation thereto, said stud having a cylindrical bearing portion in said housing, a pair of semi-annular seating elements disposed around said stud bearing surface whereby said stud can be rotated about its own axis in the seating elements, said seating elements having segmental spherical outside bearing surfaces cooperating with the housing bearing surface whereby said seating elements and stud can be tilted relative to the housing and means for urging the stud into proper bearing relation within the housing.

4. A joint comprising a housing having a bore extending therethrough, a segmental spherical wall portion near one end of said bore defining a circular opening, a stud extending freely through said opening having a cylindrical bearing portion of reduced size abutted by shoulders, a pair of spaced complementary semi-annular seating elements disposed around said cylindrical bearing portion in abutting relation to said shoulders, said seating elements having outside bearing surfaces adapted to cooperate with the bearing surfaces of said socket, said stud having a rounded end below said cylindrical bearing surface thereof and a closure plate for said socket having a depressed segmental spherical portion urged against said rounded end whereby said stud is urged into constant bearing relation with the seating elements.

5. A joint comprising a socket member having a segmental spherical wall portion therein, a stud extending freely from said socket and having a cylindrical bearing portion therein and an enlarged rounded end below said bearing portion, a pair of spaced complementary semi-annular seating elements disposed around said cylindrical bearing surface in abutting relation to said rounded end, said seating elements having segmental spherical outside bearing surfaces and a spring closure plate for said socket having a portion urged against said rounded end of the stud to force the seating elements against the bearing surface of the socket.

6. In a joint, in combination, a socket having a segmental spherical bearing portion therein, a stud extending freely therefrom having a cylindrical bearing portion in the socket, a pair of semi-annular seating elements disposed around the spherical bearing portion of said stud, said seating elements having outside spherical bearing surfaces for cooperating with the bearing surface of said socket, a curved washer disposed over the end of said stud for forming retaining means for said seating elements and means for acting against said stud to urge the respective bearing surfaces of the joint into closer relation.

7. In a joint, a housing, a stud having a cylindrical bearing surface therein, a pair of semi-spherical seating elements disposed around the cylindrical portion of said stud, said stud having a rounded end and a boss portion extending from the center of said end, a curved washer disposed around said boss, an enlarged head on said boss for holding the washer against the curved end of the stud and means for resiliently urging the respective parts of the joint into closer bearing relation.

8. A joint comprising a socket member having a segmental spherical bearing surface therein, a stud having a cylindrical portion in said socket member, a pair of spaced complementary segmental annular seating elements having inside cylindrical bearing surfaces in bearing engagement with the cylindrical stud portion and outside segmental spherical bearing surfaces in bearing engagement with the socket bearing surface, a curved retainer on the end of the stud and overlapping the bottoms of said seating elements for holding the same in position and resilient means urging said joint elements into cooperative bearing engagement.

9. A joint comprising a stud having a cylindrical bearing portion abutted on each end by an extending shoulder, a pair of spaced complementary segmental annular seating elements disposed around said bearing portion in bearing engagement therewith and in abutting relation to said shoulders, said seating elements having segmental spherical outer bearing surfaces, a housing having an inside segmental spherical bearing surface for receiving said seating elements and means for holding said joint elements in proper bearing relation in the housing whereby said stud is adapted to freely rotate about its own axis on the cylindrical bearing surfaces and to freely tilt relative to the housing on the segmental spherical bearing surfaces.

GEORGE H. HUFFERD.